INVENTOR
JAMES L. WHITAKER
BY
ATTORNEYS

INVENTOR
JAMES L. WHITAKER
BY
Roy Miller
ATTORNEYS

INVENTOR
JAMES L. WHITAKER
BY
ATTORNEYS

United States Patent Office 3,412,334 Patented Nov. 19, 1968

3,412,334
DIGITAL CORRELATOR
James L. Whitaker, La Mesa, Calif., assignor to the United States of America as represented by the Secretary of the Navy
Filed May 6, 1964, Ser. No. 365,536
4 Claims. (Cl. 325—325)

ABSTRACT OF THE DISCLOSURE

The present disclosure relates to a combination of apparatus for the correlation of signals to determine with a high degree of resolution the presence of a wanted signal of known digital code character. The present disclosure employs a reference signal generator which repetitively and cyclically regenerates a digitally coded signal in the same predetermined form as a transmitted digitally coded signal, for example, which has returned from a target to provide the input signal to the system. The problem which the apparatus of the present invention solves is that of establishing the disposition in time and consequently a measurement of distance (which may be in terms of range) which is indicated by correlation of the input signal with a particular portion of the sequentially repetitive digitally coded reference signal. In the present disclosure it will be appreciated that the received signal may result from a transmitted radar signal, for instance, originally generated in its transmitted state by the same clock pulse or other synchronizing source as is the repetitive digitally coded reference signal, the reset signal which controls the generation of the reference signal generator, and the readout pulse which controls the sampling or reading out of a plurality of integrators, each associated with a multiplier means which accepts both the input signal and the referenced signal to produce correlation or noncorrelation outputs of those received signals; there are subsequently integrated by respectively associated integrators and both the multipliers and the integrators are operative at sequential unit delays interposed upon their actuating signals. The increment of delay is substantially equal to one unit bit time period. The operation of the disclosed apparatus accordingly produces a maximum output from a particular integrator which receives a fully correlated output from its associated multiplier resulting from the correlation in time of the received input signal with the identically coded reference signal.

The invention described herein may be manufactured and used by or for the Government of the United States of America for governmental purposes without the payment of any royalties thereon or therefor.

The present invention relates to a signal processing system and more particularly to a linear digital correlator.

Although the optimum properties of matched filters are well known and have been described in the literature, certain obstacles are encountered in their application to signals of large time-bandwidth product. Time-bandwidth product is a measure of the compression ratio of a signal spectrum. The term is defined on page 229 of Modern Radar by R. S. Berkowitz, John Wiley & Sons, Inc., 1965. In particular, if the matched filter is of the linear, passive type, the individual component values have to be accurate to more than six decimal places for signal time-bandwidth products of 100. The accuracy requirement becomes more severe as the signal time-bandwidth product increases. Not only is it difficult to fabricate components to such accuracies but minute changes in component values occur with time i.e., aging effect. As a consequence, the performance of the matched filter will deteriorate with time, and the filter will rapidly become unusable when signals having very large time-bandwidth products are used.

The digital matched filter was developed to overcome the component-accuracy problem for signals having very large time-bandwidth product. In the digital matched filter, the accuracy is provided by a stable oscillator which is used to clock the shift registers. Oscillators stable to one part in $10^7$ or $10^8$ are available, and correspondingly large time-bandwidth signals may be processed.

The principal deficiency of digital matched filters is the strong signal-capture effect which suppresses the smaller signals when strong signals overlap in time. Techniques have been developed for the elimination or reduction of strong-signal-capture in digital matched filters, but they result in a filter of considerable complexity and cost.

An object of the present invention is to provide an economical and practical signal processing system for large time-bandwidth product signals.

An additional object of the present invention is to provide a signal processing system which represents an economical means of eliminating or reducing the strong-signal-capture effect which leads to complexity and high cost in digital matched filters.

A further object of the invention is to provide a signal processing system which is reproducible in large quantities, is of reasonable cost, and uses commonly stocked components.

Further objects and many of the attendant advantages of this invention will be readily appreciated as the same becomes better understood by reference to the following detailed description when considered in connection with the accompanying drawings wherein.

Figure 1:
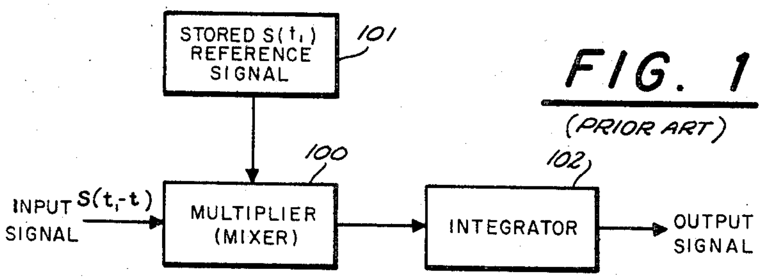
FIG. 1 is a block diagram of a cross-correlator.

In order to better understand the present invention brief reference is made to cross-correlators as exemplified by the block diagram of FIG. 1. In FIG. 1, an input signal $S(t_1-t)$ is coupled into a multiplier, i.e., mixer 100. Simultaneously a stored reference signal $S(t_1)$ from a signal generator 101 is also injected into the multiplier 100. The input signal is multiplied against the reference signal and the output coupled to an integrator 102 where an integration is performed for the duration of the reference signal. The output of the integrator is read out as an output signal.

A correlator can perform the function of a matched filter if the position of the signal in time is known. In general, the position of the signal in time is not known in advance and correlators must be built either to correlate for all expected positions for the signal in time, or to utilize time-sharing and slowly move through all expected positions of the signals relative to time throughout the search function. It is required in the latter case that the signal cooperate by repeating and maintaining stationary in time. Applied to the general search case where the position of the signal in time is not known previously, the searching correlator results in an unacceptably low data processing rate.

The technique employed in the linear digital correlator is the use of a multiplicity of cross-correlators. This technique is not expensive, as might be expected, because the cost of individual units is kept very low.

The output response of a matched filter to the signal it matches is given by $$e(t)=\int_{-\infty}^{+\infty} s(t_1)s(t_1-t)dt_1 \quad (1)$$

Comparison of this equation with the block diagram of the cross-correlator of FIG. 1 will make the equivalence self-evident. Since the cross-correlator is to be applied to the general search case where the range corresponding to the particular point in time represented by the received signal is not known, a correlator is required for each range increment. The storage system for the reference signal must therefore make the reference available to each correlator at a different time corresponding to each range increment.

Shift registers possess the required availability or access capacity to a higher degree than other storage systems such as magnetic drums or tapes, and have higher time-bandwidth product capability than accessible tapped delay lines. Use of these registers with the correlators provides the capability of storing large time-bandwidth product signals which is the desirable characteristic of the digital matched filter.

Figure 2:
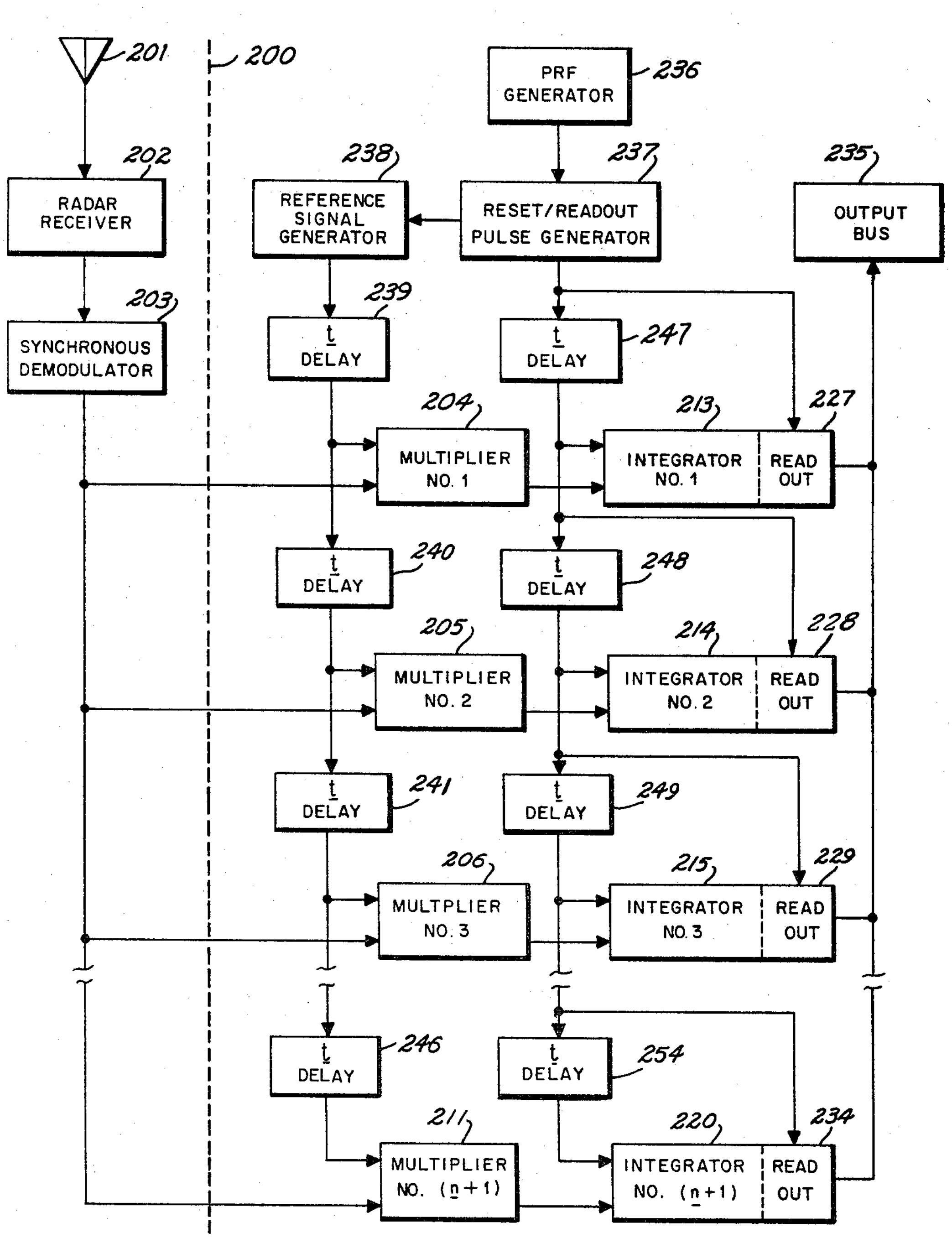
FIG. 2 is a basic digital correlator block diagram.

The digital correlator of the present invention is set forth in FIG. 2 which illustrates the basic digital correlator block diagram. The portion within dotted line 200 represents the digital correlator equipment while the portion outside shows the associated radar equipment and a synchronous demodulator.

In the system of FIG. 2 received radar signals are coupled in from an antenna 201 to a radar receiver 202 and from the radar receiver to a synchronous demodulator 203 which heterodynes the signal to "zero" frequency. The output of the synchronous demodulator 203 is coupled to a multiplicity of multipliers 204 through 211. Multiplier 211 bears the subscript $n+1$ in that the number of multipliers bears a direct relationship to the number of bits ($n$) in the transmitted and received signal. In the present instance a 7 bit code is utilized therefore there are 8 multipliers.

The output sof the multipliers 204 through 211 are coupled to integrators 213 through 220, respectively, which, in turn, are coupled to readouts 227 through 234 respectively. The outputs from the individual readouts 227 through 234 are connected to a common bus 235.

The output from a pulse repetition frequency generator 236 is coupled into a reset readout pulse generator 237 having multiple outputs. One of the outputs from the pulse generator 237 is coupled to a reference signal generator 237 is coupled to a reference signal generator 238 which generates a duplicate of the signal which has been transmitted from the associated radar transmitter. The output of the reference signal generator 238 is coupled to delay units 239 through 246. The delay units 239 through 246 are connected in series. The delay units delay the reference signal by a total of $n \times t$ where $n$ is the number of bits in the signal and $t$ is the time width of an individual bit. The output of delay unit 239 is coupled to multiplier 204, the output of delay unit 240 is coupled to multiplier 205, etc.

Another output from the pulse generator 237 is coupled to another group of delay units 247 through 254, also connected in series. The outputs of the individual delay units 247 through 254 are coupled to respective inputs of respective integrators 213 through 220.

An additional output from the pulse generator 237 is coupled as a readout pulse to the readout block 227. The output of delay unit 247 is also coupled to readout 228, the output of delay unit 248 is coupled to readout unit 229, the output of delay 249 to readout, 230 etc., to the output of delay unit 253, to readout 234.

The multipliers 204 through 211 and integrators 213 through 220 for the cross-correlator may take many forms. In some designs the multipliers may be mixers and the integrators narrow-band intermediate-frequency amplifiers. A multiplier integrator of lower cost is possible if that portion of the receiver preceding the correlator heterodynes the signal to "zero" frequency, a process usually referred to as synchronous detection, resulting in a bipolar video-frequency signal. This is set forth in the block diagram of FIG. 2 wherein the synchronous demodulator 203 is illustrated as part of the system. In that case the integrators 213 through 220 could take the simpler form of a DC voltage integrator with bidirectional or bipolar capabilities. The delay units illustrated are in actuality, shift register bits.

*Operation*

The input signal is injected into $n+1$ multipliers, each delayed by one unit of delay $t$ from the previous multiplier, preferably equal to one "bit" of the digitally coded signal and derived from appropriate multiple delay means which may be suitably synchronized with the clock or pulse source employed to synchronize the entire system. The number $n$ is the number of bits in the code, or the pulse compression ratio in the case of "chirp" signals. Each multiplier feeds an associated integrator, i.e., multiplier 204 feeds integrator 213, etc. The integrators 213 through 220 each integrate for the duration of the reference signal T and the integrated value is read out by the readout pulse coupled into readouts 227 to 234 as a voltage amplitude, either positive or negative. The output of each integrator appears sequentially on the common output bus 235. Each integrator is then reset to 0 by the reset pulse coupled in from the associated delay units 247 through 254, the no signal condition, immediately after being read out. The reset is accomplished by the same pulse which was used for readout, the pulse having been delayed by one unit of delay as illustrated by the several waveforms of FIG. 4.

After reset, the individual correlators repeat the above process, in this case at a later stage in time. The correlation is accomplished simultaneously by the input code being received simultaneously by the multiplicity of multipliers as shown in FIG. 2, each bit of the INPUT CODE being multiplied against a time coincident bit of the REFERENCE CODE which comprises the second input to the multiplicity of multipliers as shown in FIG. 2. Accordingly, the input signal is simultaneously, rather than sequentially multiplied, and the respective integrated outputs of the several multipliers are sequentially sampled at time displacements of one bit from each other. This determines which of the simultaneously processed operations has produced a maximum amplitude output signal indicative of code coincidence and therefore establishes the precise timed displacement of the received INPUT CODE signal. The reference signal is generated continuously, providing the proper reference at the proper time. Therefore, any signal having a time-bandwidth product of $n$, corresponding to $n$ code elements, or to a pulse compression ratio of $n$, can be cross-correlated whenever it occurs, because the use of $n+1$ correlators covers all points in time. The one additional correlator is required to provide time for resetting the associated integrators.

Ordinarily, for instance, if 100 range bins (i.e., successive increments of time representative of commensurate increments of distance in terms of range) were being examined, the prior methods would require that 100 correlators be used, one for each range bin. However, through the use of the present invention it is only necessary that $n+1$ correlators be utilized. Therefore, eight correlators can search the 100 range bins resulting in a considerable savings.

Figure 3:
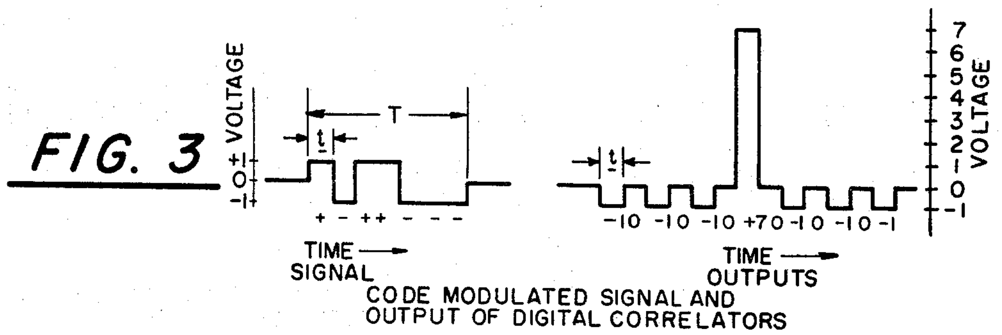
FIG. 3 is an illustration of a 7-element Barker code and its correlation function.

In order to provide a more detailed description of the process the optimum 7-element Barker code will be examined which is shown with its correlation function in FIG. 3.

Figure 4:
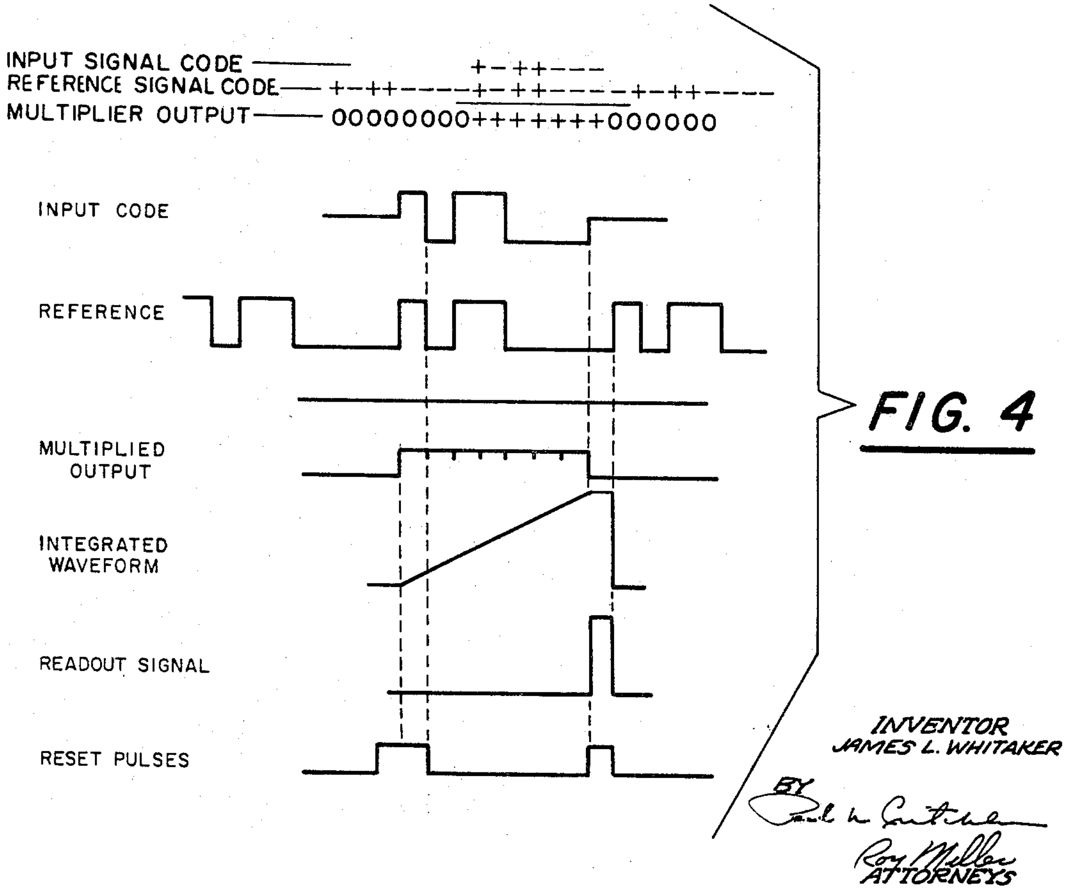
FIG. 4 illustrates the various waveforms in a coincident input signal.

When the input binary such as the waveform labeled INPUT CODE in FIG. 4, is algebraically multiplied by a reference signal that repeats that same binary code continuously such as the waveform labeled REFERENCE, in FIG. 4, time coincidence of each bit of the INPUT CODE with each corresponding bit of the REFERENCE signal produces a multiplier output comprising a long block or sequence of adjacent unipolar pulses extending the length of the input code as shown in the waveform labeled MULTIPLIED OUTPUT in FIG. 4. The block of pulses is integrated, producing an output such as the waveform labeled INTEGRATED WAVEFORM in FIG. 4. A readout of the correlation peak is obtained from the repetitive integrator at a sampling time corresponding to the end of the code of the reference signal. This is the READOUT SIGNAL as illustrated and indicated in FIG. 4. Accordingly, as illustrated by the several waveforms of FIG. 4, time coincidence of each bit of the INPUT CODE with the correspondingly coded bit of the REFERENCE CODE will produce a maximum amplitude INTEGRATED WAVEFORM which in turn generates a maximum amplitude READOUT SIGNAL.

In order to accomplish this, the position of the readout pulse coincides with the reset pulse which immediately follows the last digit of the code in the reference signal. In order to have the integrator ready for time-sharing at its next range position, it is reset to its no-signal condition, coincident with the same readout pulse. To allow sufficient reset time, a redundant code bit is inserted in the reference signal at a time corresponding to the time of the reset pulse.

Figure 5:
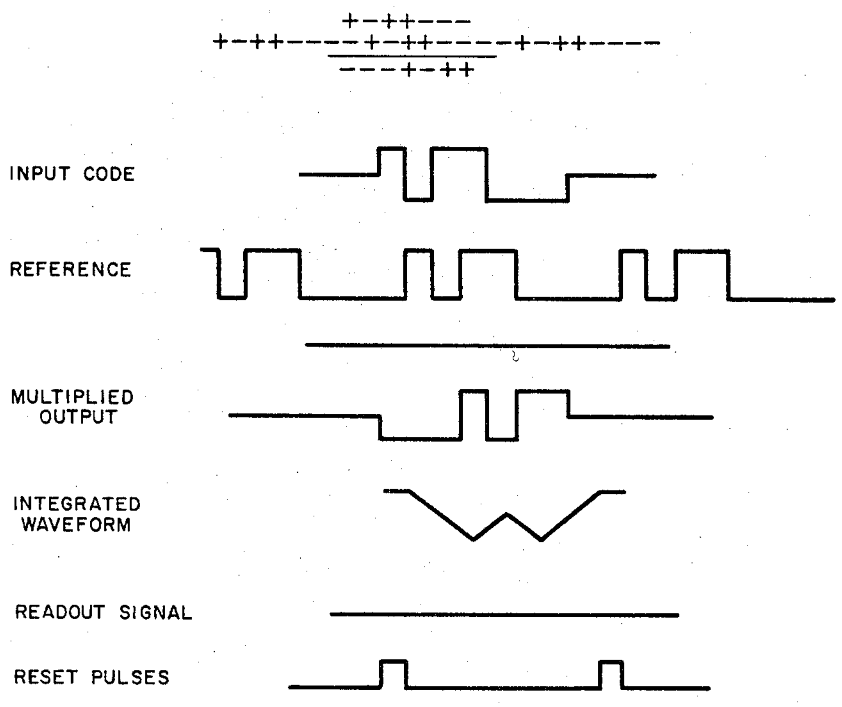
FIG. 5 illustrates the various waveforms in a noncoincident input signal.

When the code increments of the two signals are not time-coincident, and have a relative position such as the one shown in FIG. 5 as representative of several possibilities, the result is as shown. A typical noncoincident relationship between corresponding bits of the two signals is illustrated and represented by an input signal shown in the uppermost portion of FIG. 5 and represented by + − + + − − − together with a repetitive reference code of the same coded sequenc of bipolar elements but displaced so as to be non-coincident element-by-element with the input code. This relationship is also illustrated by the uppermost waveform labeled INPUT CODE and the second waveform of FIG. 5 labeled REFERENCE. The result of a MULTIPLIED OUTPUT is illustrated by the waveform so labeled in FIG. 5 and it will be seen that the multiplied output is consistent with the − − − + − + + result indicated by the bipolar illustration shown at the top of FIG. 5.

Figure 6:
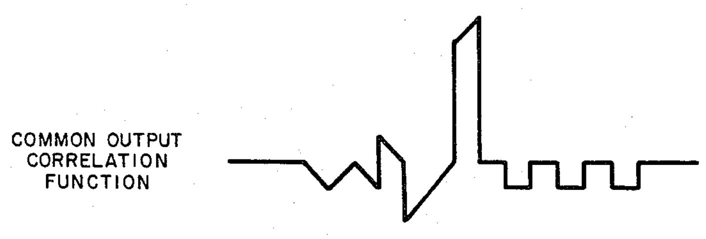
FIG. 6 illustrates the common output correlation function from a group of digital correlators at adjacent time intervals.

The INTEGRATED WAVEFORM shown in FIG. 5 is the result of an integration operation performed on the MULTIPLIED OUTPUT waveform illustrated immediately above. Since the readout is sampled at the end of the reference code word, no signal is produced as indicated by the zero amplitude READOUT SIGNAL of FIG. 5. Since integration occurs between reset pulses and the position of the reset pulse is determined by the position of the reference signal, this particular multiplier output integrates to 0, i.e., the integration of its successively positive and negative variations produces a zero output. The analysis of all possible positions of the signal with respect to the reference signal code may be shown. However, it is not done at this time in the interests of simplicity. The combined output on the common output bus is the correlation function for the Barker 7-element coded signal. This is shown in FIG. 6. As shown in FIG. 2, the multiplicity of multipliers and associated integrators are caused to read out to a common output terminal or OUTPUT BUS 235. However, the readout signal of each successive integrator is delayed one increment of time or one bit of the code word so that successive readout signals are accumulated from the several integrators and their associated readout means to produce a common output correlation function such as that illustrated in FIG. 6. Thus, each of the several readout means 27, 28, 29, and 34 of FIG. 2 may contribute increments to the composite sequential signal which is a common output correlation function as illustrated in FIG. 6.

As is evident from FIG. 6, when the entire input code word is in timed and coded coincidence with the reference signal, a maximum amplitude readout signal will be generated by the multiplication and integration operations, thus establishing the exact point in time of the detected code coincidence for purposes such as determining range, for example. Accordingly, the maximum amplitude element of the common output correlation function waveform as illustrated in FIG. 6 would establish the time disposition of signal coincidence between the INPUT CODE and the coded REFERENCE. Thus, it is to be understood that the waveform of FIG. 6 is a compilation of successively sampled outputs such as would appear cumulatively at the OUTPUT BUS 235 of FIG. 2. However, the individual integrator outputs are not shown.

Through the use of the present system, the strong signal-capture effect which suppresses the smaller signals when strong signals overlap in time associated with digital matched filters is obviated. Also, through the use of $n+1$ multipliers the need for a number of correlators corresponding to the number of range bins to be examined is obviated thereby resulting in a very economical signal processing system.

Obviously many modifications and variations of the present invention are possible in the light of the above teachings. It is therefore to be understood that within the scope of the appended claims the invention may be practiced otherwise than as specifically described.

What is claimed is:

1. A linear digital correlation system for detecting the time delay between the transmission of a cyclically pulsed digitally coded signal and its return as an input signal comprising:

a pulse repetition frequency generator for controlling the cyclical pulsed transmission of said digitally coded signal;

input means adapted to receive the returned digitally coded signal and including a synchronous demodulator for producing output signals representative of the digital coding contained in said returned signals;

a multiplicity of mixing means being operatively connected to simultaneously receive said output signals from said input means;

a reference signal generator for repetitively generating a reference signal containing the digital code of said input signal, said reference signal generator being synchronously operative with said pulse repetition frequency generator;

a plurality of unit delay means connected in series to sequentially receive the output of said reference signal generator, each said delay means being operative to delay said reference signal by a time substantially equal to one bit increment of said digital code and connected to provide a second input signal to a respectively associated one of said multiplicity of mixing means;

integrator means corresponding in number to said multiplicity of mixing means and each having an input operatively connected to receive the output of a respective mixing means;

readout means associated with each said integrator means;

a reset and readout pulse generator connected to cyclically actuate the readout means of each said integrator means, and including means for sequentially delaying the cyclical actuation of each successive readout means by a unit of time substantially equal to one bit increment of said digital code, said readout pulse generator being synchronously operative with said reference signal generator and said pulse repetition frequency generator.

2. A correlation system as set forth in claim 1 wherein said synchronous demodulator operatively coupled between said input means and the inputs of said multiplicity of mixing means for heterodyning said input signal to zero frequency thereby generating a coherent bipolar input signal.

3. A correlation system as set forth in claim 1 wherein said input signal is in binary form; and the multiplicity of multipliers is equal in number to $n+1$ where $n$ is the number of bits in the signal.

4. A correlation system as set forth in claim 1 wherein said integrator means operates to integrate for the duration of the reference signal from the output of the reference signal generator; and wherein said readout means functions to reset said integrator means at the end of the duration of the reference signal.

References Cited

UNITED STATES PATENTS

| | | | |
|---|---|---|---|
| 3,018,962 | 1/1962 | Jones et al. | 235—181 |
| 3,036,775 | 5/1962 | McDermid et al. | 235—181 X |

ROBERT L. GRIFFIN, *Primary Examiner.*

W. S. FROMMER, *Assistant Examiner.*